United States Patent
Dong et al.

(10) Patent No.: US 10,860,092 B2
(45) Date of Patent: Dec. 8, 2020

(54) INTERFACE INTERACTION APPARATUS AND METHOD

(71) Applicant: Huawei Technologies Co., Ltd., Shenzhen (CN)

(72) Inventors: Jianming Dong, Shenzhen (CN); Weixi Zheng, Shenzhen (CN); Zhe Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 571 days.

(21) Appl. No.: 15/405,404

(22) Filed: Jan. 13, 2017

(65) Prior Publication Data
US 2017/0199565 A1    Jul. 13, 2017

(30) Foreign Application Priority Data

Jan. 13, 2016   (CN) .......................... 2016 1 0021040

(51) Int. Cl.
*G06F 3/01*    (2006.01)
*G06F 3/0482*    (2013.01)
(Continued)

(52) U.S. Cl.
CPC ........... *G06F 3/012* (2013.01); *G02B 27/017* (2013.01); *G06F 3/017* (2013.01); *G06F 3/038* (2013.01);
(Continued)

(58) Field of Classification Search
CPC ........ G06F 3/012; G06F 3/017; G06F 3/0482; G06F 3/04845; G06F 3/0346;
(Continued)

(56) References Cited

U.S. PATENT DOCUMENTS

| 2005/0210410 A1 | 9/2005 | Ohwa et al. |
| 2010/0058248 A1 | 3/2010 | Park et al. |

(Continued)

FOREIGN PATENT DOCUMENTS

| CN | 103959135 A | 7/2014 |
| CN | 104267833 A | 1/2015 |

(Continued)

OTHER PUBLICATIONS

Foreign Communication From A Counterpart Application, European Application No. 17151336.9, European Office Action dated May 25, 2018, 6 pages.

(Continued)

*Primary Examiner* — Amare Mengistu
*Assistant Examiner* — Gloryvid Figueroa-Gibson
(74) *Attorney, Agent, or Firm* — Conley Rose, P.C.

(57) ABSTRACT

An interface interaction method and apparatus for actively interacting with a virtual interface only by rotating a user head, and pertaining to the field of augmented reality technologies. The disclosure includes obtaining rotation parameters of the user head, where the rotation parameters include a rotation direction, a rotation angle, and a rotation angular acceleration, determining an interaction instruction according to the obtained rotation parameters and a preset instruction determining rule, and executing the determined interaction instruction to implement interaction control of interfaces displayed by a display component. Hence, a virtual interface interaction manner is expanded, and user experience is improved.

22 Claims, 14 Drawing Sheets

(51) Int. Cl.
*G02B 27/01* (2006.01)
*G06F 3/0346* (2013.01)
*G06F 3/038* (2013.01)
*G06F 3/0484* (2013.01)
G02B 27/00 (2006.01)
G06T 19/00 (2011.01)

(52) U.S. Cl.
CPC .......... *G06F 3/0346* (2013.01); *G06F 3/0482* (2013.01); *G06F 3/04845* (2013.01); *G02B 27/0093* (2013.01); *G06T 19/006* (2013.01)

(58) Field of Classification Search
CPC ... G06F 3/038; G02B 27/017; G02B 27/0093; G06T 19/006
USPC ........................................................ 345/156
See application file for complete search history.

(56) References Cited

U.S. PATENT DOCUMENTS

| | | | | |
|---|---|---|---|---|
| 2011/0032274 | A1* | 2/2011 | Miyata | G06F 3/011 345/660 |
| 2013/0135353 | A1* | 5/2013 | Wheeler | G06F 3/012 345/660 |
| 2013/0246967 | A1 | 9/2013 | Wheeler et al. | |
| 2015/0089440 | A1* | 3/2015 | Choi | G06F 3/0485 715/784 |
| 2015/0346813 | A1* | 12/2015 | Vargas | G06F 3/012 345/8 |

FOREIGN PATENT DOCUMENTS

| | | |
|---|---|---|
| CN | 104866105 A | 8/2015 |
| CN | 105243362 A | 1/2016 |
| WO | 2013081723 A1 | 6/2013 |

OTHER PUBLICATIONS

Machine Translation and Abstract of Chinese Publication No. CN104267833, Jan. 7, 2015, 21 pages.
Machine Translation and Abstract of Chinese Publication No. CN104866105, Aug. 26, 2015, 12 pages.
Machine Translation and Abstract of Chinese Publication No. CN105243362, Jan. 13, 2016, 31 pages.
Foreign Communication From A Counterpart Application, Chinese Application No. 201610021040.3, Chinese Office Action dated Feb. 26, 2019, 7 pages.
Foreign Communication From A Counterpart Application, European Application No. 17151336.9, Extended European Search Report dated May 26, 2017, 11 pages.

* cited by examiner

INTERFACE INTERACTION APPARATUS AND METHOD

CROSS-REFERENCE TO RELATED APPLICATIONS

This application claims priority to Chinese Patent Application No. 201610021040.3 filed on Jan. 13, 2016, which is hereby incorporated by reference in its entirety.

TECHNICAL FIELD

The present disclosure relates to the field of augmented reality technologies, and in particular, to an interface interaction apparatus and method.

BACKGROUND

With continuous development of electronic and display technologies, people impose a higher requirement on information access convenience. An augmented reality technology is one of the cutting-edge technologies that can meet this requirement.

In an existing augmented reality technology, an object in a real-time image collected by an image collection device can be analyzed automatically, information related to the identified object is queried, such as a text, a picture, a video, and a sound, and the queried information is integrated into the real-time image for displaying. Smart glasses are used as an example. The smart glasses include one or more cameras that have a same shooting view as a wearer. When the cameras capture an object, such as a high building, the smart glasses identify the high building, query information about the building according to an identification result, such as a name, a height, and a construction date, and display the queried information using lenses of the smart glasses.

In a process of implementing the present disclosure, the inventor finds that the other approaches have at least the following problems.

In the existing augmented reality technology, a manner of displaying information about an object in a real-time image is relatively fixed, and a user can only passively receive the displayed information and cannot interact with the displayed information, which leads to a relatively poor user experience.

SUMMARY

To resolve a problem of a relatively poor user experience because a user can only passively receive displayed information and cannot interact with the displayed information, embodiments of the present disclosure provide an interface interaction apparatus and method. The technical solutions are as follows.

According to a first aspect, an interface interaction method is provided, where the method includes obtaining rotation parameters of a user head, where the rotation parameters include a rotation direction, a rotation angle, and a rotation angular acceleration, determining an interaction instruction according to the obtained rotation parameters and a preset instruction determining rule, and executing the determined interaction instruction to implement interaction control of interfaces displayed by a display component.

In the interface interaction method provided in this embodiment of the present disclosure, rotation parameters such as a rotation direction, a rotation angle, and a rotation angular acceleration of a user head are obtained, an interaction instruction is determined with reference to the rotation parameters and a preset instruction determining rule, and the determined interaction instruction is executed to implement interaction control of interfaces displayed by a display component. A method for actively interacting with a virtual interface only by rotating a user head is provided, expanding a virtual interface interaction manner, and improving user experience.

In a first possible implementation manner of the first aspect, the displayed interfaces include at least two interfaces, and the at least two interfaces belong to different interface groups, where each interface group includes at least one interface, and only one interface in each interface group is displayed at a time. A feasible interface display manner is provided such that a user may switch between different displayed information by means of a simple head movement, a well-ordered arrangement of massive information is implemented, and information access becomes more convenient.

With reference to the first possible implementation manner of the first aspect, in a second possible implementation manner of the first aspect, the at least two interfaces are arranged in a left-to-right sequence, a first interface that faces a front-view sightline of a user is in an active state, and determining an interaction instruction according to the obtained rotation parameters and a preset instruction determining rule includes determining whether $r>t$ is true, where r is a rotation angle of the user head in the vertical direction, and t is a rotation angle of the user head in the horizontal direction, and generating a first-type interaction instruction according to r and a rotation angular acceleration a of the user head in the vertical direction if $r>t$ is true, or generating a second-type interaction instruction according to t and a rotation angular acceleration a' of the user head in the horizontal direction if $r>t$ is false. Different interaction instructions are determined according to two dimensions, the vertical direction and the horizontal direction, and a manner of using a virtual interface is expanded.

With reference to the second possible implementation manner of the first aspect, in a third possible implementation manner of the first aspect, generating a first-type interaction instruction according to r and a rotation angular acceleration a of the user head in the vertical direction includes generating a first interaction instruction when the user head rotates upward, $|r| \in [A_1, B_1]$, and $|a| < a_1$, where the first interaction instruction is used to instruct the display component to replace the first interface with a second interface, the second interface is an interface that is in an interface group to which the first interface belongs and that follows the first interface, $A_1$, $B_1$, and $a_1$ are preset values, $0 < A_1 < B_1$, and $0 < a_1$. A method for interacting with a virtual interface within a single interface group by rotating a user head is provided, and a manner of using a virtual interface is expanded.

With reference to the second possible implementation manner of the first aspect, in a fourth possible implementation manner of the first aspect, generating a first-type interaction instruction according to r and a rotation angular acceleration a of the user head in the vertical direction includes generating a second interaction instruction when the user head rotates downward, $|r| \in [A_2, B_2]$, and $|a| < a_2$, where the second interaction instruction is used to instruct the display component to display at least one control interface of the first interface, $A_2$, $B_2$, and $a_2$ are preset values, $0 < A_2 < B_2$, and $0 < a_2$. A method for triggering a control interface by rotating a user head is provided, and a manner of using a virtual interface is expanded.

With reference to the fourth possible implementation manner of the first aspect, in a fifth possible implementation manner of the first aspect, each control interface corresponds to one control operation, and the method further includes determining a target control interface, where the target control interface is a control interface that faces a front-view sightline of the user, controlling the target control interface to enter an active state, detecting whether a duration that the target control interface remains in the active state is greater than a predetermined duration, and generating a third interaction instruction if a detection result is that the duration that the target control interface remains in the active state is greater than the predetermined duration, where the third interaction instruction is used to instruct the display component to display an execution result after a control operation corresponding to the target control interface is performed on the first interface. A method for controlling an interface function by rotating a user head is provided, and a manner of using a virtual interface is expanded.

With reference to the second possible implementation manner of the first aspect, in a sixth possible implementation manner of the first aspect, generating a first-type interaction instruction according to r and a rotation angular acceleration a of the user head in the vertical direction includes generating a fourth interaction instruction when the user head rotates upward and $|a| \geq a_3$, or when the user head rotates downward and $|a| \geq a_4$, where the fourth interaction instruction is used to instruct the display component to control the at least one interface to rotate around the user head according to the rotation parameters of the user head. A method for controlling an interface to follow a user head into rotation is provided, and a manner of using a virtual interface is expanded.

With reference to the second possible implementation manner of the first aspect, in a seventh possible implementation manner of the first aspect, generating a second-type interaction instruction according to t and a rotation angular acceleration a' of the user head in the horizontal direction includes determining, when $|a'| < a_5$, a third interface that faces a front-view sightline of the user, where the third interface is an interface in the at least two interfaces that is located on the left or right of the first interface, and generating a fifth interaction instruction, where the fifth interaction instruction is used to instruct the display component to switch an interface in an active state from the first interface to the third interface, $a_5$ is a preset value, and $0 < a_5$. A method for switching an active interface among multiple interface groups by rotating a user head is provided, and a manner of using a virtual interface is expanded.

With reference to the second possible implementation manner of the first aspect, in an eighth possible implementation manner of the first aspect, generating a second-type interaction instruction according to t and a rotation angular acceleration a' of the user head in the horizontal direction includes generating a sixth interaction instruction when $|a'| < a_6$, a front-view sightline of the user does not face any interface, and no other interface in the at least two interfaces exists in the horizontal direction in which the user head rotates, where the sixth interaction instruction is used to instruct the display component to display a functional interface except the at least two interfaces, $a_6$ is a preset value, and $0 < a_6$. A method for triggering an extra functional interface by rotating a user head is provided, and a manner of using a virtual interface is expanded.

With reference to the second possible implementation manner of the first aspect, in a ninth possible implementation manner of the first aspect, generating a second-type interaction instruction according to t and a rotation angular acceleration a' of the user head in the horizontal direction includes generating a seventh interaction instruction when $|a'| \geq a_7$, where the seventh interaction instruction is used to instruct the display component to control the at least one interface to rotate around the user head according to the rotation parameters of the user head, $a_7$ is a preset value, and $0 < a_7$. A method for controlling an interface to follow a user head into rotation is provided, and a manner of using a virtual interface is expanded.

With reference to any one of the first aspect, or the first to the ninth possible implementation manners of the first aspect, in a tenth possible implementation manner of the first aspect, the displayed interfaces are interfaces based on an augmented reality technology or a virtual reality technology.

According to a second aspect, an embodiment of the present disclosure provides an electronic device, where the electronic device includes a display component, a processor, and a memory, and a bus, where the processor is configured to execute an instruction stored in the memory, and the processor executes the instruction to implement the interface interaction method according to the first aspect or any one of the possible implementation manners of the first aspect.

According to a third aspect, an embodiment of the present disclosure provides an interface interaction apparatus, where the interface interaction apparatus includes at least one unit, and the at least one unit is configured to implement the interface interaction method according to the first aspect or any one of the possible implementation manners of the first aspect.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
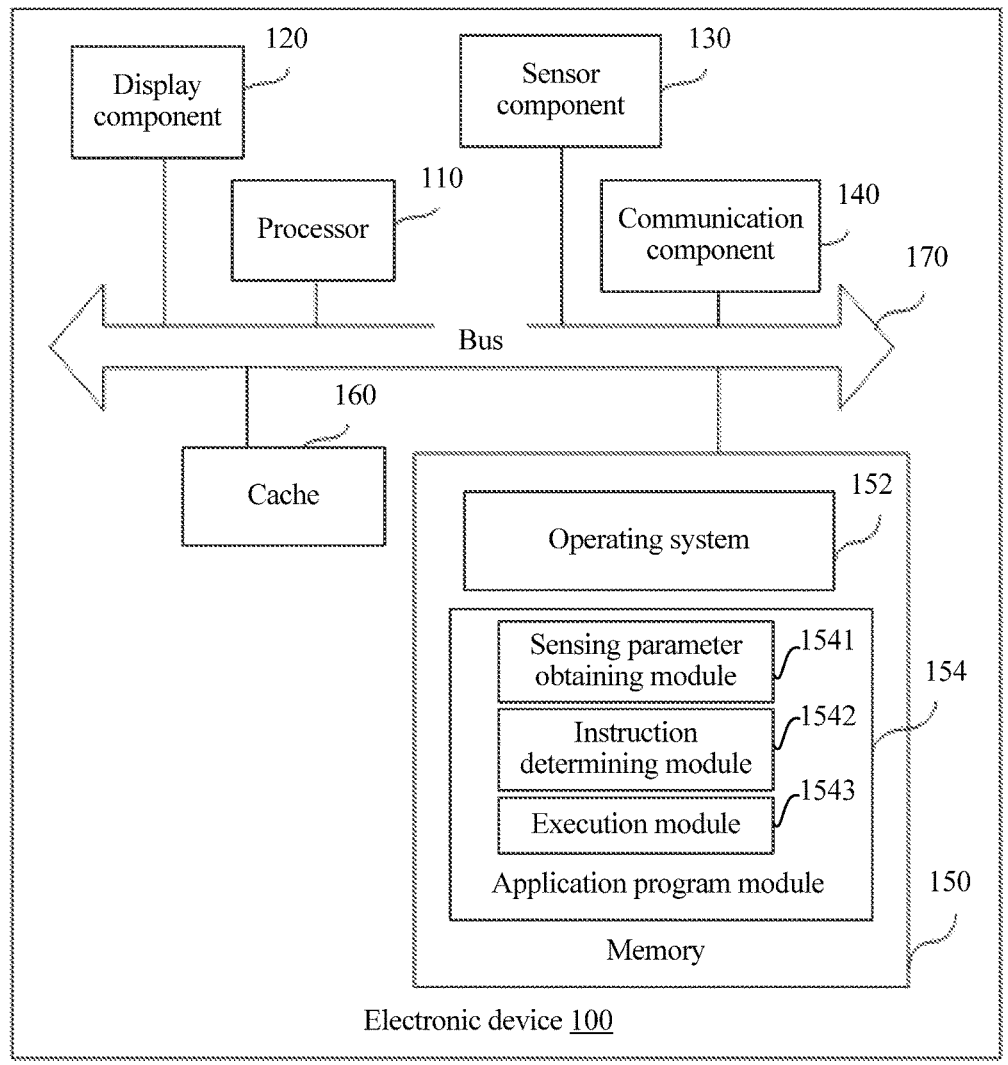
FIG. 1 is a structural block diagram of an electronic device according to an exemplary embodiment of the present disclosure.

FIG. 1 is a structural block diagram of an electronic device according to an exemplary embodiment of the present disclosure. The electronic device 100 may include a processor 110, a display component 120, a memory 150, and a bus 170. The display component 120 and the memory 150 are connected to the processor 110 using the bus 170.

The processor 110 includes an arithmetic logic part, a register part, a control part, and the like. The processor 110 may be an independent central processing unit (CPU) or an embedded processor, such as a micro processor unit (MPU), a micro controller unit (MCU), or a digital signal processor (DSP).

The display component 120 may include various display apparatuses used by fixed, portable, or wearable devices, such as a liquid crystal display, a touch liquid crystal display, or a transmissive projection display based on an optical principle. Alternatively, the display component 120 may be a perspective display apparatus based on a video synthesis technology.

The memory 150 is implemented by any type of or a combination of a volatile storage device and a non-volatile storage device, such as a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a disk, or an optical disc. The memory 150 may be used to store an instruction that can be executed by a software program, a module, or the like.

The processor 110 is configured to execute the instruction stored in the memory 150. The processor 110 executes the instruction to implement the method of obtaining rotation parameters of a user head, where the rotation parameters include a rotation direction, a rotation angle, and a rotation angular acceleration, determining an interaction instruction according to the obtained rotation parameters and a preset instruction determining rule, and executing the determined interaction instruction to implement interaction control of interfaces displayed by the display component.

Optionally, as shown in FIG. 1, the electronic device 100 may further include components such as a sensor component 130, a communication component 140, and a cache 160. The sensor component 130, the communication component 140, and the cache 160 are connected to the processor 110 using the bus 170.

The sensor component 130 may include a gyroscope and an accelerometer. The gyroscope can measure an angle and an angular velocity obtained by rotating around one or more axes, and the accelerometer can measure a rotation angular acceleration. A complete movement in three-dimensional space may be accurately tracked and captured using these two sensors together. In the present disclosure, the sensor component 130 may be worn on a user head according to the settings to measure rotation parameters of the user head.

The communication component 140 is configured to communicate with the exterior, and may include multiple types of ports, such as an Ethernet port or a wireless transceiver.

The cache 160 is configured to cache some intermediate data that is produced by the processor 110 during calculation.

Optionally, the memory 150 may store an operating system 152 and an application program module 154 required by at least one function. The operating system 152 may be an operating system, such as a real-time operating system, for example RTX®, LINUX®, UNIX®, WINDOWS®, or OS X®. The application program module 154 may include a sensing parameter obtaining module 1541, an instruction determining module 1542, and an execution module 1543.

The sensing parameter obtaining module 1541 is configured to obtain the rotation parameters of the user head, where the rotation parameters include a rotation direction, a rotation angle, and a rotation angular acceleration.

The instruction determining module 1542 is configured to determine an interaction instruction according to the obtained rotation parameters and a preset instruction determining rule.

The execution module 1543 is configured to execute the determined interaction instruction to implement interaction control of the interfaces displayed by the display component.

Optionally, in the present disclosure, the electronic device 100 may further include a camera (not shown).

In an example of the foregoing embodiment of the present disclosure, all the components are disposed in an independent part. For example, the foregoing electronic device 100 may be implemented as a smart wearable device (such as smart glasses or a head-mounted virtual reality device), and the smart wearable device includes all the foregoing components.

Optionally, in another possible implementation manner, all the foregoing components may be disposed in different parts. For example, the foregoing electronic device 100 may include a smart wearable device and an auxiliary operation device (such as a portable mobile terminal or a cloud server). The display component 120, the sensor component 130, and the communication component 140 are disposed in the smart wearable device, and the processor 110, the memory 150, the cache 160, and the bus 170 are disposed in the auxiliary operation device.

Figure 2A:
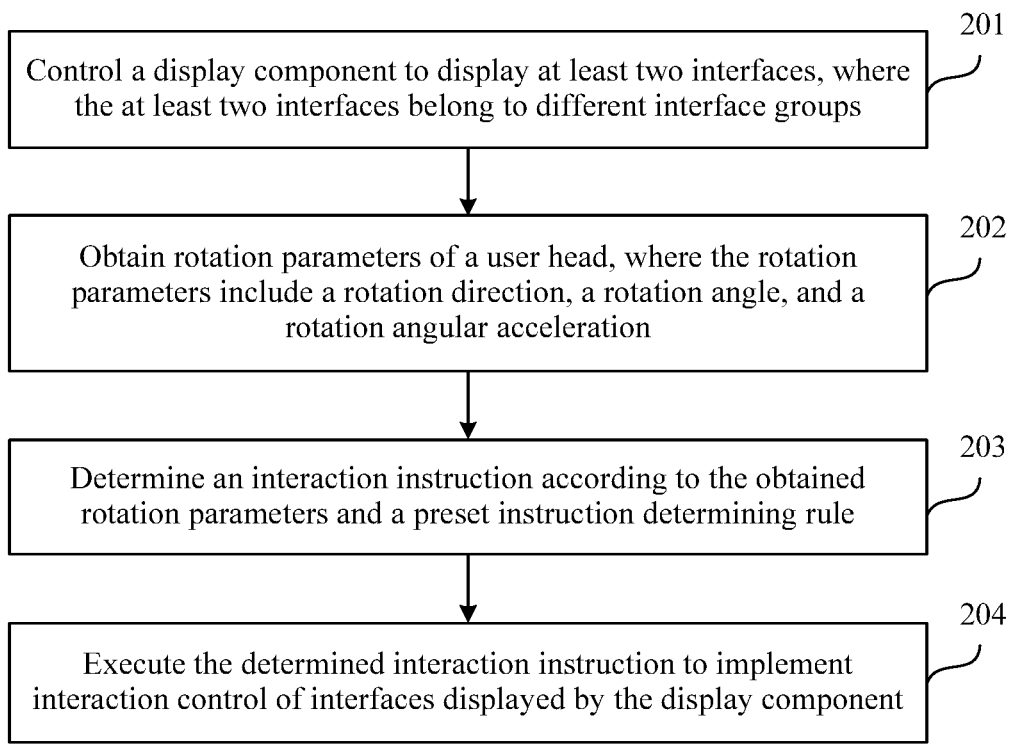
FIG. 2A is a method flowchart of an interface interaction method according to an exemplary embodiment of the present disclosure.

FIG. 2A is a method flowchart of an interface interaction method according to an exemplary embodiment of the present disclosure. The method may be applied to the electronic device shown in FIG. 1. As shown in FIG. 2A, the interface interaction method may include the following steps.

Step 201: Control a display component to display at least two interfaces, where the at least two interfaces belong to different interface groups.

Each interface group includes at least one interface, and only one interface in each interface group is displayed at a time.

In this embodiment of the present disclosure, the interfaces displayed by the display component of the electronic device may be interfaces based on an augmented reality technology or a virtual reality technology. For example, the at least two interfaces may be virtual interfaces displayed on a transmissive projection display or a perspective display apparatus based on a video synthesis technology. The at least two interfaces may be arranged in a linear sequence. For example, the at least two interfaces may be arranged in a left-to-right sequence, or the at least two interfaces may be arranged in a top-to-bottom sequence. Each displayed interface belongs to a different interface group, that is, only a front interface in an interface group is completely visible, and another interface is partly or completely blocked by the front interface. The electronic device displays by default a first interface in a direction of a front-view sightline of a user, and the first interface that faces the front-view sightline of the user is in an active state when the foregoing at least two interfaces are displayed for the first time. The interface in the active state may have a special display effect, such as an enlarged shape, a highlighted outline, outer glow, or projection. In practical application, limited by a factor such as a size of a display or a display apparatus, a user may only see an interface in a specific view range in front of the user. In this disclosed embodiment, the interface that faces the front-view sightline of the user may be an interface that intersects with the front-view sightline of the user. For the front view described in this embodiment of the present disclosure, a reference object is the user head, and is not related to another body part of a user, that is, the foregoing front view direction is in front of a user face.

In practical application, in the foregoing at least two interfaces, an interface group corresponding to a more centrally located interface may display relatively important content, and an interface group corresponding to a more edge-located interface may display relatively less important content. Similarly, in a same interface group, a front interface may display relatively important content, and a following interface may display relatively less important content. An interface closer to the front displays more important content.

Figure 2B:
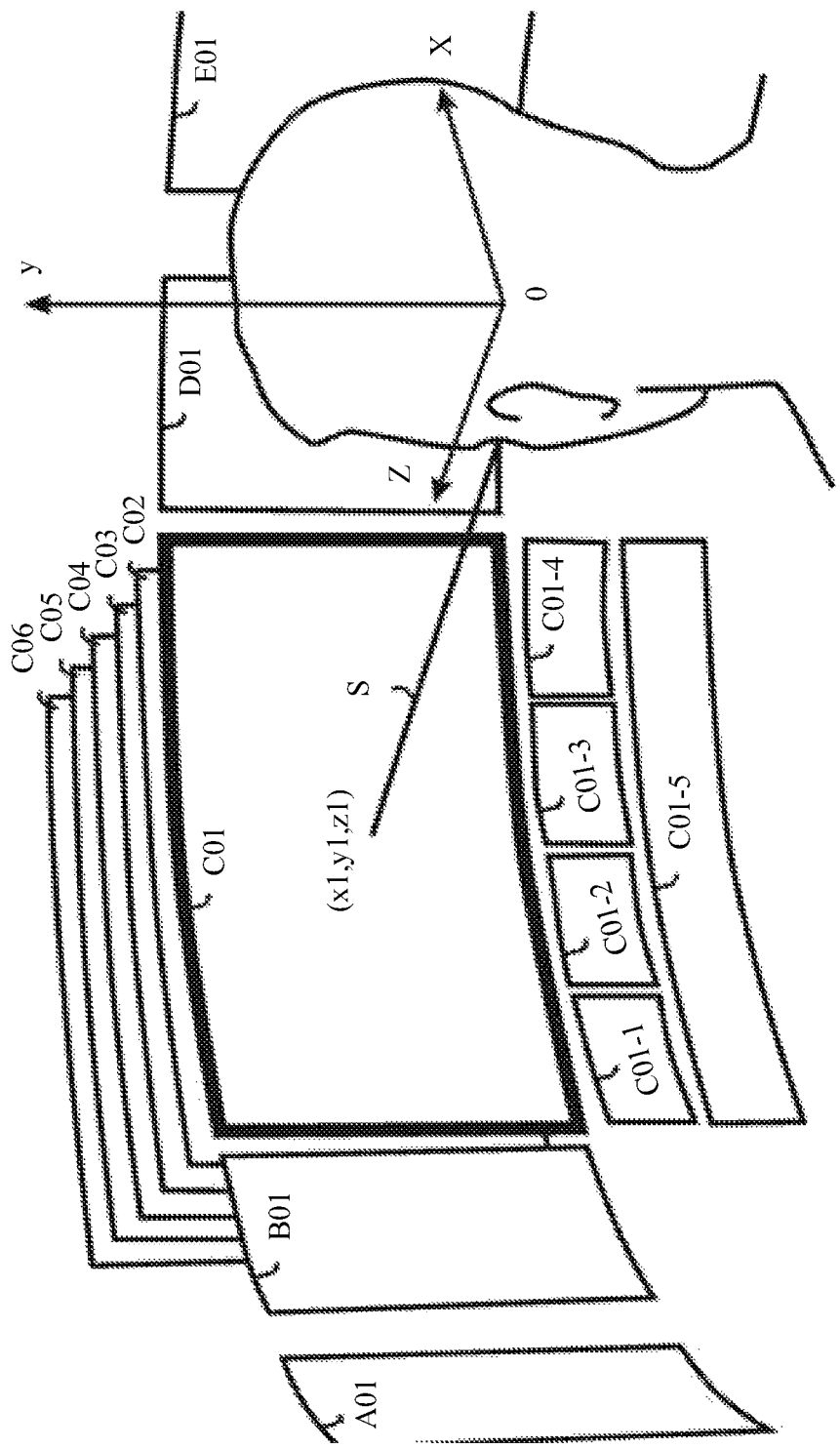
FIG. 2B is a schematic diagram of an interface layout according to the embodiment shown in FIG. 2A.

For example, the at least two interfaces are displayed in a left-to-right sequence. Referring to FIG. 2B, FIG. 2B shows a schematic diagram of an interface layout provided by this embodiment of the present disclosure. As shown in FIG. 2B, a center of a user head is used as an origin to create a space coordinate system. The right side of a user is the positive direction of the x-axis, the upper side is the positive direction of the y-axis, and the front is the positive direction of the z-axis. Five interfaces shown in FIG. 2B are displayed in specified positions around the user head in a left-to-right sequence. The five interfaces are an interface A01, an interface B01, an interface C01, an interface D01, and an interface E01 respectively. Optionally, the interface layout may further include a function specific interface (not shown), such as an exit interface. The function specific interface may be displayed behind the user head.

In FIG. 2B, the interface C01 belongs to an interface group C. The interface group C further includes an interface C02 to an interface C06, and the interface C02 to the interface C06 are sequentially arranged behind the interface C01 in the positive direction of the z-axis. Correspondingly, the interface A01 belongs to an interface group A, the interface B01 belongs to an interface group B, the interface D01 belongs to an interface group D, and the interface E01 belongs to an interface group E. Other interfaces included in the interface groups A, B, D, and E are not shown in the figure.

In FIG. 2B, the interface C01 that faces a front-view sightline of the user is in an active state. Under the interface C01, there are control interfaces of the interface C01, an interface C01-1, an interface C01-2, an interface C01-3, an interface C01-4, and an interface C01-5. Each control interface corresponds to one control function, such as confirming, cancelling, adding, deleting, editing, saving, or favorites. In an initial state, the control interfaces (the interface C01-1, the interface C01-2, the interface C01-3, the interface C01-4, and the interface C01-5) of the interface C01 are hidden and not directly displayed.

In FIG. 2B, the front-view sightline of the user faces the interface C01, the front-view sightline of the user is S, and central coordinates of the interface C01 are $(x_1, y_1, z_1)$. In this case, C01 is in the active state.

Step 201 may be implemented by the processor 110 in the electronic device 100 using the execution module 1543.

Step 202: Obtain rotation parameters of a user head, where the rotation parameters include a rotation direction, a rotation angle, and a rotation angular acceleration.

The electronic device may obtain the rotation parameters of the user head using a sensor component worn on the user head.

Step 202 may be implemented by the processor 110 in the electronic device 100 by executing the sensing parameter obtaining module 1541.

Step 203: Determine an interaction instruction according to the obtained rotation parameters and a preset instruction determining rule.

Figure 2C:
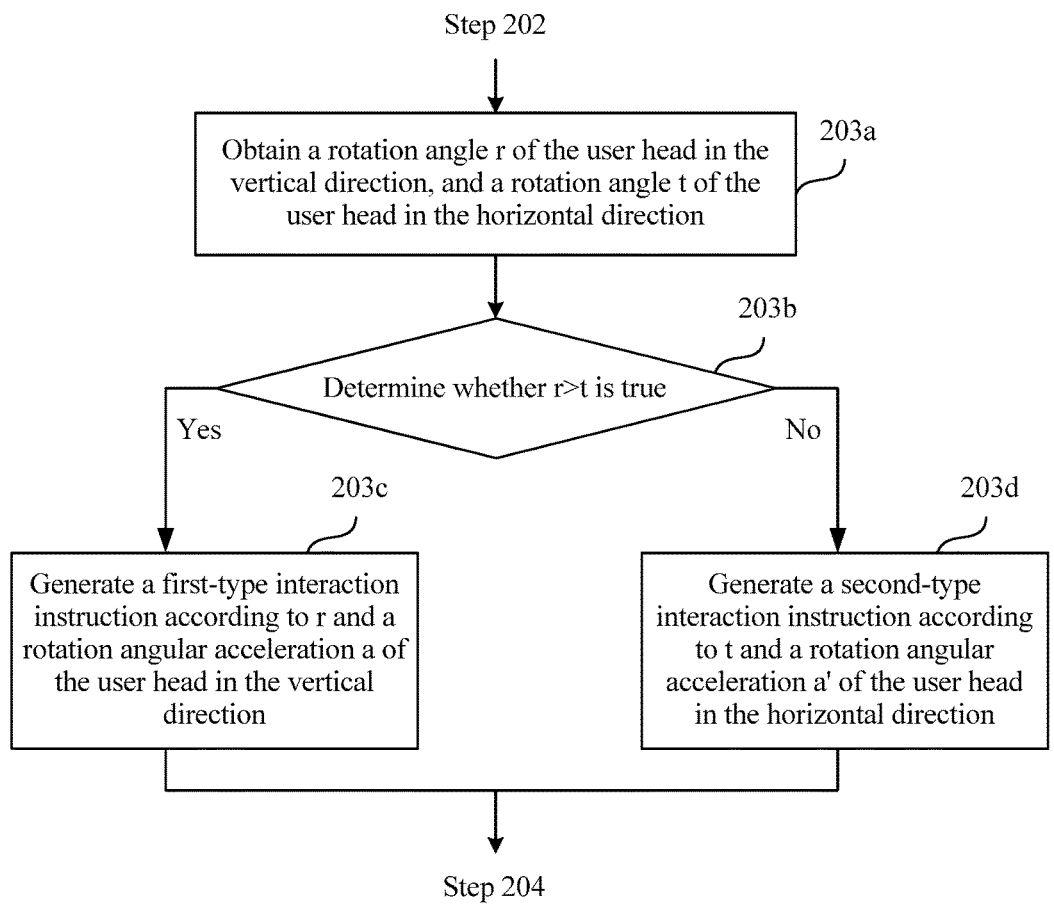
FIG. 2C is a method flowchart of an interaction instruction determining method according to the embodiment shown in FIG. 2A.
Figure 2D:
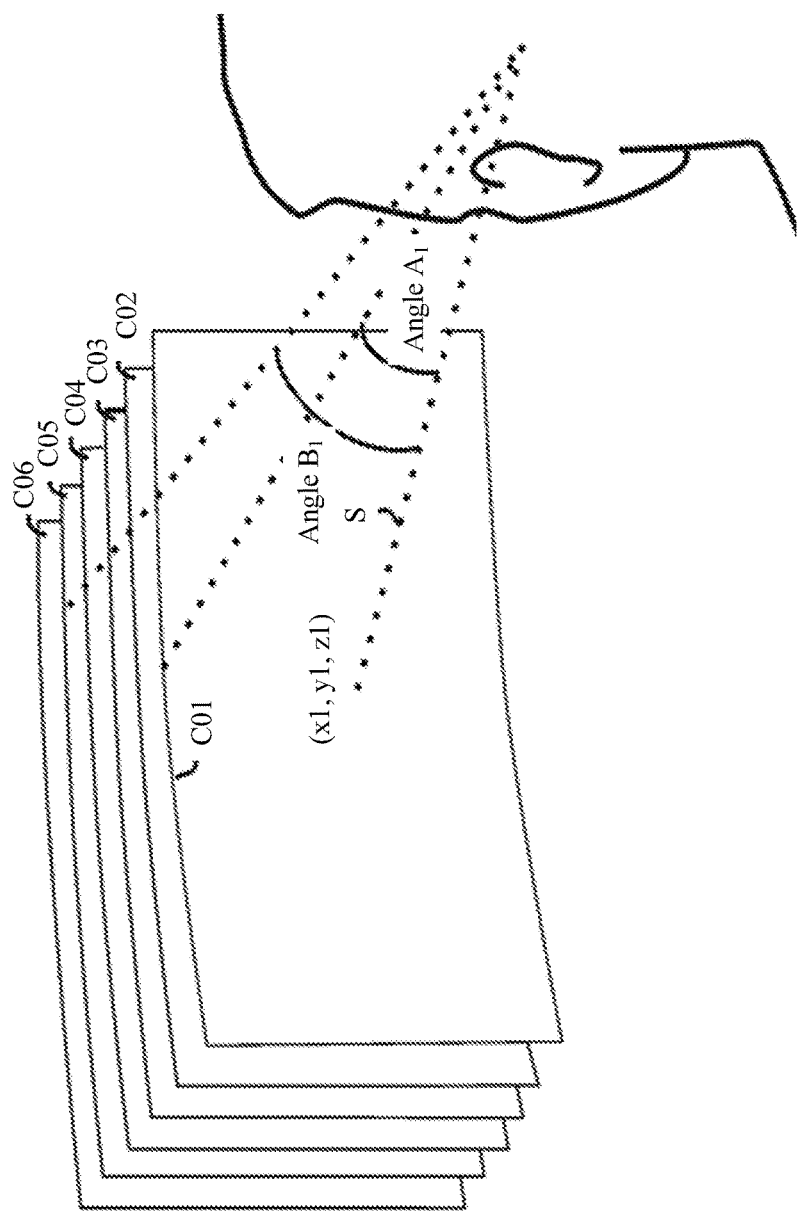
FIG. 2D, FIG. 2E, FIG. 2F, and FIG. 2G are schematic diagrams for replacing an interface according to the embodiment shown in FIG. 2A.
Figure 2E:
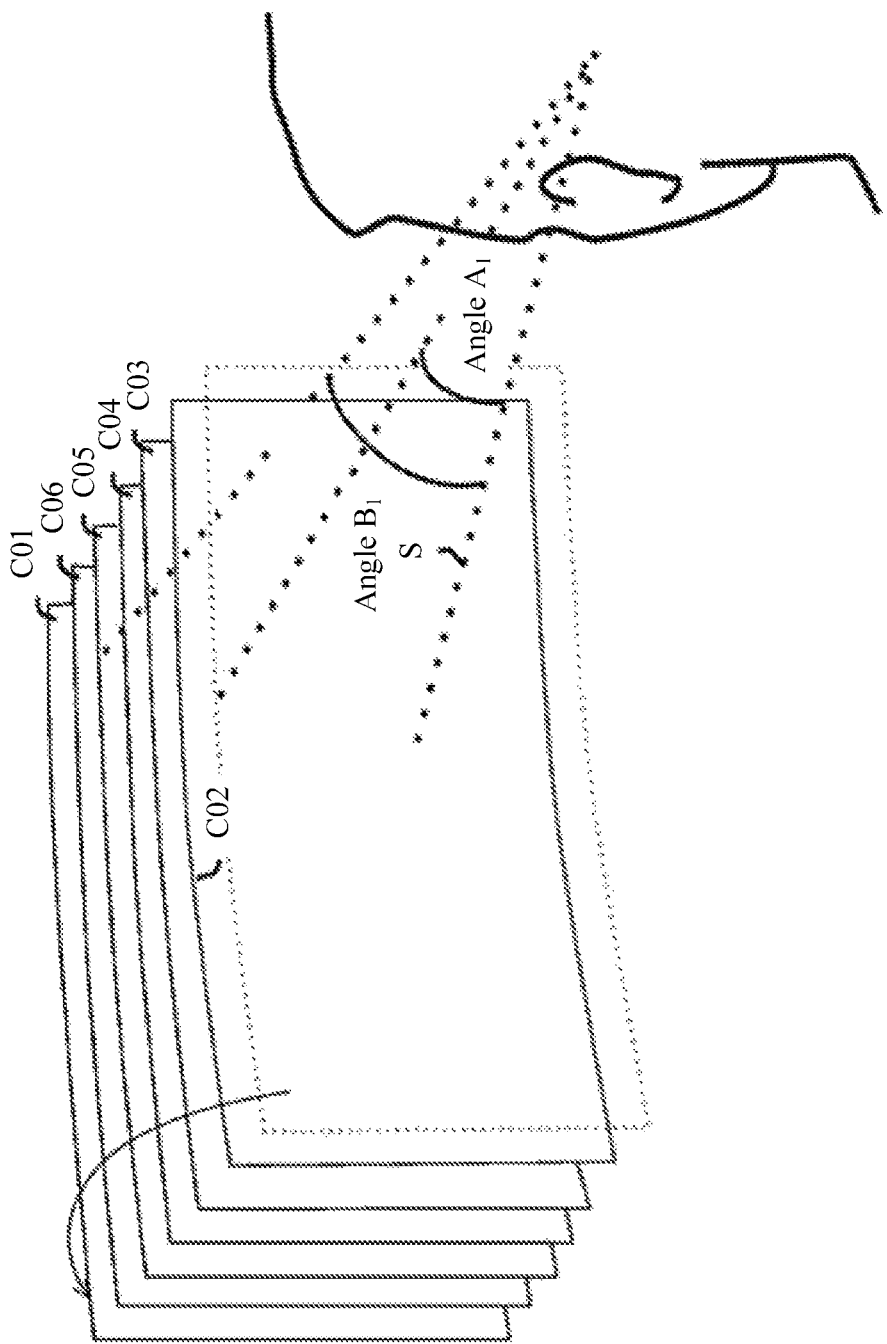
Figure 2F:
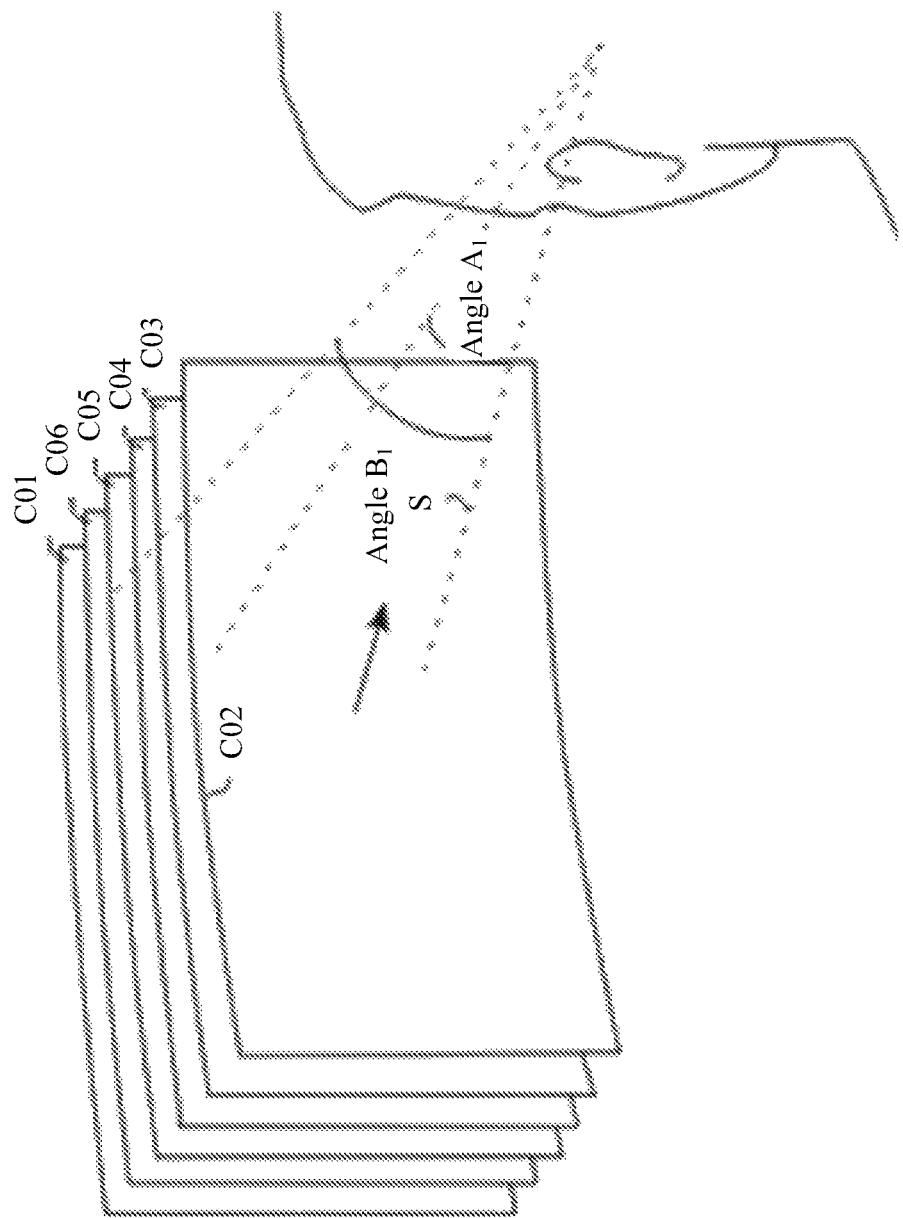
Figure 2G:
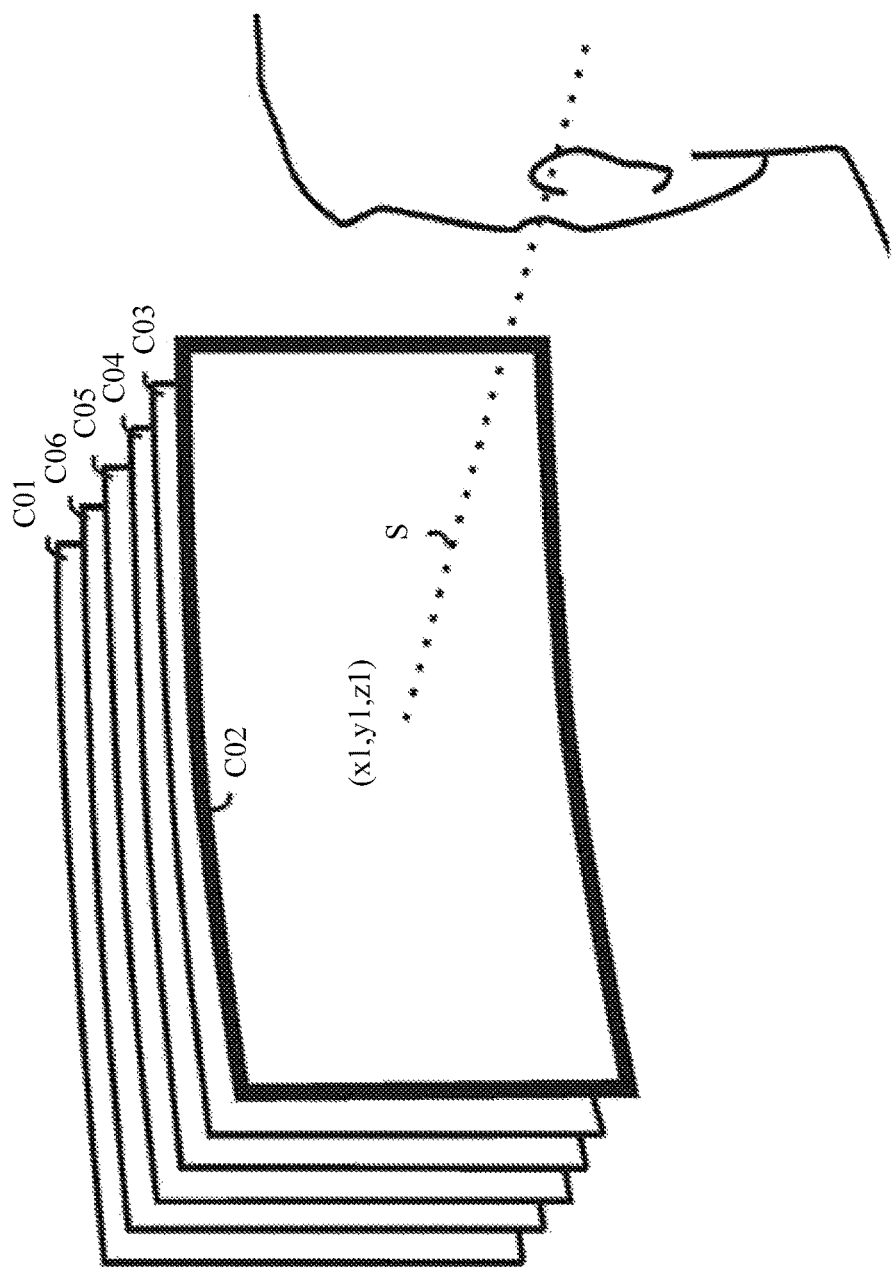

In this embodiment of the present disclosure, the electronic device may determine different interaction instructions according to different rotation directions and different rotation angular accelerations of the user head as well as the preset instruction determining rule. For example, referring to FIG. 2C, FIG. 2C shows a method flowchart of an interaction instruction determining method according to this embodiment of the present disclosure. As shown in FIG. 2C, the interaction instruction determining method may include the following steps.

Step 203a: Obtain a rotation angle r of the user head in the vertical direction, and a rotation angle t of the user head in the horizontal direction.

After obtaining the rotation parameters of the user head, the electronic device may divide, according to the vertical direction and the horizontal direction, the rotation parameters into two groups, a rotation angle and an angular acceleration in the vertical direction, and a rotation angle and an angular acceleration in the horizontal direction.

The interface layout shown in FIG. 2B is used as an example. The electronic device may divide the rotation parameters of the user head into a rotation angle and an angular acceleration on the yz plane (namely the vertical direction), and a rotation angle and an angular acceleration on the xz plane (namely the horizontal direction).

Step 203b: Determine whether r>t is true, proceed to step 203c if r>t is true, and proceed to step 203d if r>t is false.

An interaction instruction may be generated according to the rotation angle and the angular acceleration of the user head in the vertical direction if the rotation angle r of the user head in the vertical direction is greater than the rotation angle t of the user head in the horizontal direction, indicating a relatively large rotation angle of the user head in the vertical direction. An interaction instruction may be generated according to the rotation angle and the angular acceleration of the user head in the horizontal direction if the rotation angle r of the user head in the vertical direction is not greater than the rotation angle t of the user head in the horizontal direction, indicating a relatively large rotation angle of the user head in the horizontal direction. Interaction instructions generated according to rotation angles and angular accelerations in different directions have different interaction effects.

Step 203c: Generate a first-type interaction instruction according to r and a rotation angular acceleration a of the user head in the vertical direction.

A manner of generating the first-type interaction instruction according to r and the rotation angular acceleration a of the user head in the vertical direction may include the following types.

1. A first interaction instruction is generated when the user head rotates upward, $|r| \in [A_1, B_1]$, and $|a| < a_1$. The first interaction instruction is used to instruct the display component to replace the first interface with a second interface, the second interface is an interface that is in an interface group to which the first interface belongs and that follows the first interface, $A_1$, $B_1$, and $a_1$ are preset values, $0 < A_1 < B_1$, and $0 < a_1$.

Further, the interface layout shown in FIG. 2B is used as an example. Referring to FIG. 2D to FIG. 2G, FIG. 2D to FIG. 2G show schematic diagrams for replacing an interface. When the electronic device detects that the user head rotates upward, a rotation angle is between $A_1$ and $B_1$, and a rotation angular acceleration is less than a threshold, it is considered that the user performs an operation of replacing the current active interface by rotating the head. In this case, the electronic device generates the first interaction instruction. When the electronic device executes the instruction, the interface C01 is first deactivated and then moves behind the interface C06, and at the same time, the interface C02 moves in the negative direction of the z-axis until central coordinates of the interface C02 change to $(x_1, y_1, z_1)$. Afterward, the interface C02 is activated.

2. A second interaction instruction is generated when the user head rotates downward, $|r| \in [A_2, B_2]$, and $|a| < a_2$. The second interaction instruction is used to instruct the display component to display at least one control interface of the first interface, $A_2$, $B_2$, and $a_2$ are preset values, $0 < A_2 < B_2$, and $0 < a_2$.

Optionally, each control interface corresponds to one control operation. After the second interaction instruction is generated, the electronic device may further determine a target control interface, where the target control interface is a control interface that faces a front-view sightline of the user, control the target control interface to enter an active state, detect whether a duration that the target control interface remains in the active state is greater than a predetermined duration, and generate a third interaction instruction if a detection result is that the duration that the target control interface remains in the active state is greater than the predetermined duration. The third interaction instruction is used to instruct the display component to display an execution result after a control operation corresponding to the target control interface is performed on the first interface.

The electronic device may obtain, by means of calculation according to a front-view sightline of the user before the head rotates and the rotation parameters of the user head, the front-view sightline of the user after the head rotates.

Figure 2H:
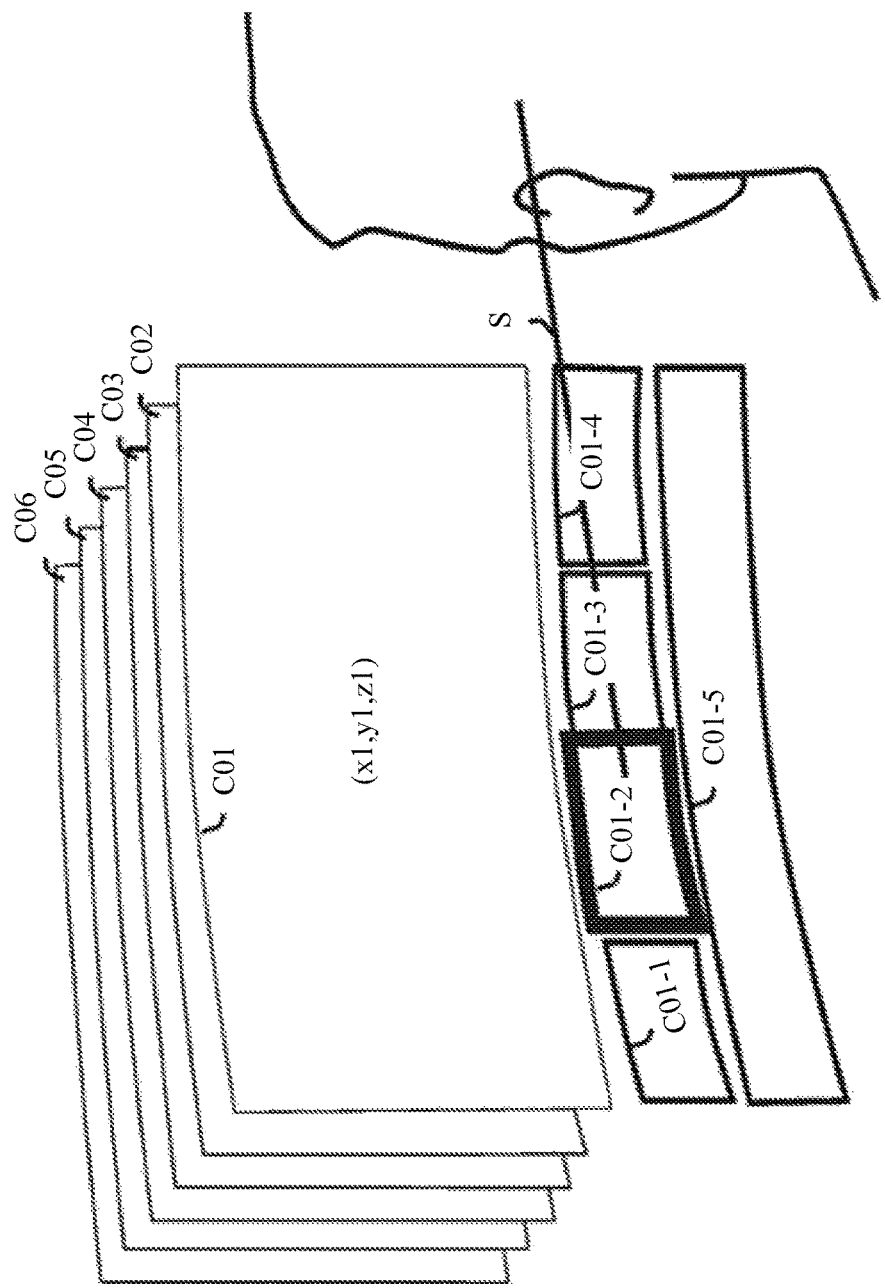
FIG. 2H is a schematic diagram for displaying a control interface according to the embodiment shown in FIG. 2A.

The interface layout shown in FIG. 2B is used as an example. Referring to FIG. 2H, FIG. 2H shows a schematic diagram for displaying a control interface. When the electronic device detects that the user head rotates downward, a rotation angle is between $A_2$ and $B_2$, and a rotation angular acceleration is less than a threshold, it is considered that the user performs an operation of triggering a control interface by rotating the head. In this case, the electronic device generates the second interaction instruction. When the electronic device executes the instruction, the control interfaces (the interface C01-1, the interface C01-2, the interface C01-3, the interface C01-4, and the interface C01-5) are displayed under the interface C01, the interface C01 is deactivated, and the electronic device determines that the interface C01-2 (target control interface) that faces a front-view sightline of the user is activated. The user may further switch, by rotating the head in the horizontal or vertical direction, a control interface that faces a front-view sightline. Further, the electronic device generates the third interaction instruction corresponding to the control interface C01-2 when detecting that a duration that the interface C01-2 remains in the active state is greater than a predetermined duration (such as 2 seconds). After the electronic device executes the third interaction instruction, the display component displays a result after a control operation corresponding to the interface C01-2 is performed on the interface C01.

In another possible implementation manner, the first interaction instruction and the second interaction instruction may correspond to reverse rotation directions. For example, when a rotation direction of the user head is downward, $|r| \in [A_1, B_1]$, and $|a| < a_1$, the first interaction instruction is generated, and the interface C01 is switched to the interface C02, when a rotation direction of the user head is upward, $|r| \in [A_2, B_2]$, and $|a| < a_2$, the second interaction instruction is generated, and at least one control interface is displayed above the interface C01.

In practical application, the electronic device may not detect a rotation angle of the user head in the vertical direction but detect only a rotation angular acceleration of the user head in the vertical direction when the first interaction instruction and the second interaction instruction are generated. For example, the first interaction instruction is generated when the user head rotates upward and $|a| < a_1$, or the second interaction instruction is generated when the user head rotates downward and $|a| < a_2$.

3. When the user head rotates upward and $|a| \geq a_3$, or when the user head rotates downward and $|a| \geq a_4$, a fourth interaction instruction is generated. The fourth interaction instruction is used to instruct the display component to control the at least one interface to rotate around the user head according to the rotation parameters of the user head.

It should be noted that, when the electronic device supports generation of the first interaction instruction, the second interaction instruction, and the fourth interaction instruction, $a_3$ needs to be greater than or equal to $a_1$, $a_4$ needs to be greater than or equal to $a_2$, and values of $a_1$ and $a_2$ may be the same or different.

Figure 2I:
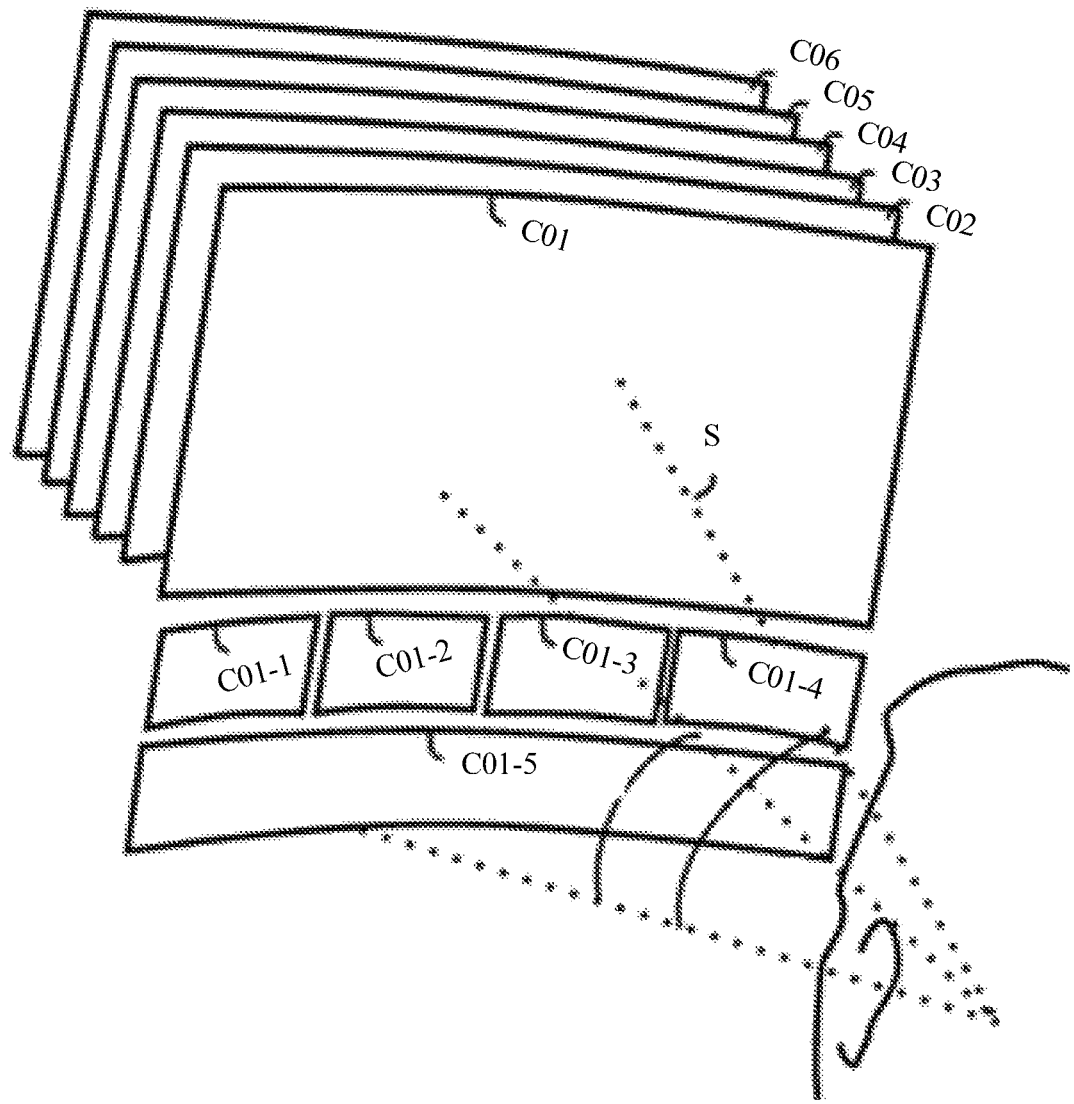
FIG. 2I is a schematic diagram for rotating an interface according to the embodiment shown in FIG. 2A.

The interface layout shown in FIG. 2B is used as an example. Referring to FIG. 2I, FIG. 2I shows a schematic diagram for rotating an interface. The electronic device generates the fourth interaction instruction when the user head rotates upward and a rotation angular acceleration reaches or exceeds a threshold. When the electronic device executes the instruction, the at least one interface (only the interface C01 is shown in FIG. 2I) as a whole follows the user head into upward rotation, with the user head at the center. Rotation parameters of the at least one interface are consistent with the rotation parameters of the user head in order to ensure that a front-view sightline of the user is located at the center of the interface C01. Alternatively, in another possible implementation manner, rotation parameters of the at least one interface may be consistent only with rotation parameters of the user head in the vertical direction.

Similarly, when the user head rotates downward and a rotation angular acceleration reaches or exceeds a threshold, the at least one interface also follows the user head into rotation, with the user head at the center. Details are described herein.

In another possible implementation manner, a fourth interaction instruction is generated when the user head rotates upward, $|r| > B_1$, and $|a| < a_1$, or when the user head rotates downward, $|r|>B_2$, and $|a|<a_2$. That is, despite a relatively small angular acceleration, the at least one interface may be controlled to follow the user head into rotation, with the user head at the center when an upward or downward rotation angle of the user head exceeds a preset threshold.

Figure 2J:
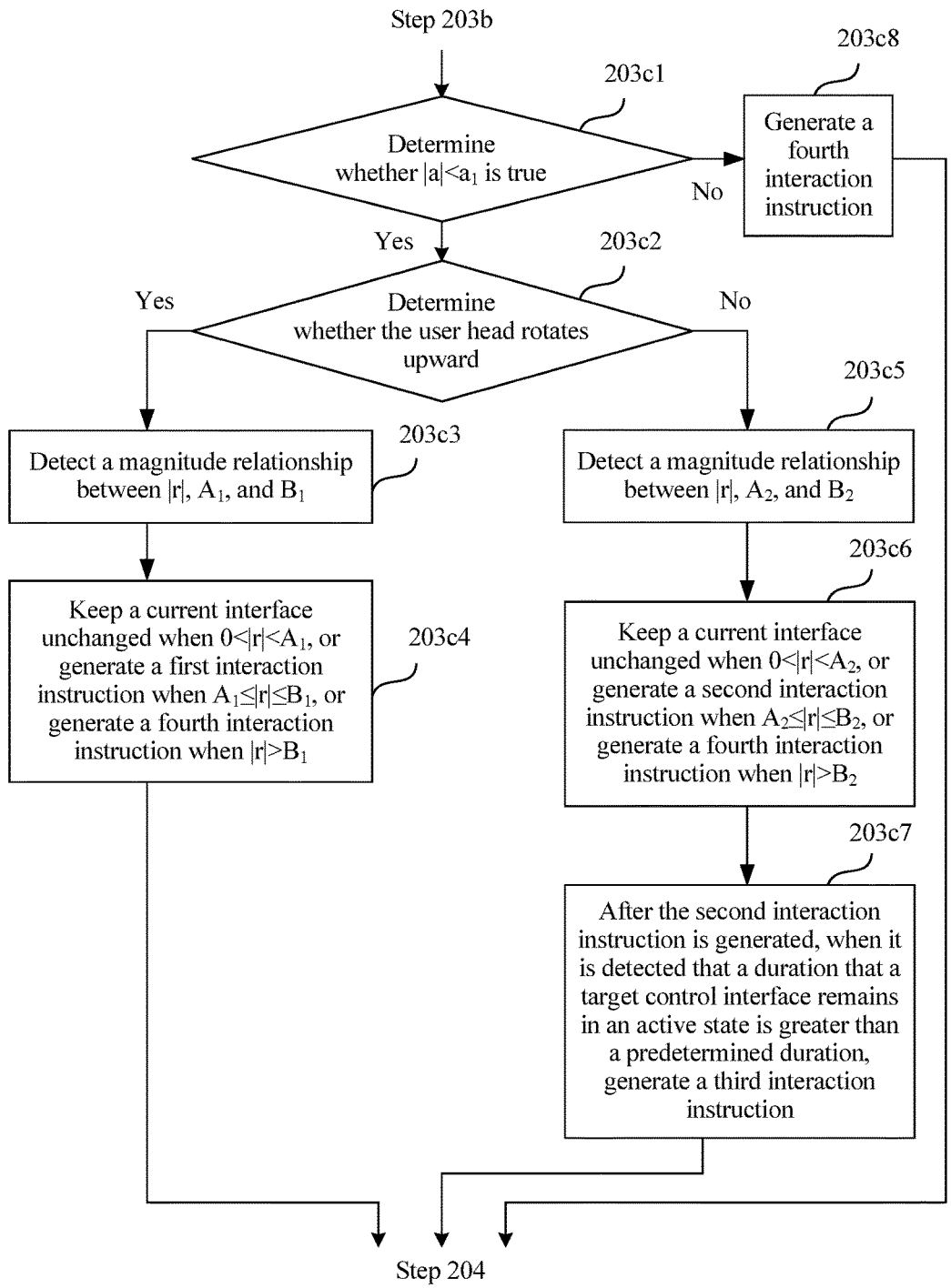
FIG. 2J is a flowchart of a first-type interaction instruction generating method according to the embodiment shown in FIG. 2A.

Further, FIG. 2D to FIG. 2I are used as an example. Referring to FIG. 2J, FIG. 2J shows a flowchart of a first-type interaction instruction generating method, and shows a possible implementation procedure of step 203c. For example, values of $a_1$, $a_2$, $a_3$, and $a_4$ are the same. As shown in FIG. 2J, the first-type interaction instruction generating method may include the following steps.

Step 203c1: Determine whether $|a|<a_1$ is true, proceed to step 203c2 if $|a|<a_1$ is true, and proceed to step 203c8 if $|a|<a_1$ is false.

Step 203c2: Determine whether the user head rotates upward, proceed to step 203c3 if the user head rotates upward, and proceed to step 203c5 if the user head does not rotate upward.

Step 203c3: Detect a magnitude relationship between $|r|$, $A_1$, and $B_1$.

Step 203c4: Keep a current interface unchanged when $0<|r|<A_1$, or generate a first interaction instruction when $A_1 \leq |r|<B_1$, or generate a fourth interaction instruction when $|r|>B_1$.

Step 203c5: Detect a magnitude relationship between $|r|$, $A_2$, and $B_2$.

Step 203c6: Keep a current interface unchanged when $0<|r|<A_2$, or generate a second interaction instruction when $A_2 \leq |r| \leq B_2$, or generate a fourth interaction instruction when $|r|>B_2$.

Step 203c7: After the second interaction instruction is generated, when it is detected that a duration that a target control interface remains in an active state is greater than a predetermined duration, generate a third interaction instruction.

Step 203c8: Generate a fourth interaction instruction.

Step 203d: Generate a second-type interaction instruction according to t and a rotation angular acceleration a' of the user head in the horizontal direction.

Similar to step 203c, a manner of generating the second-type interaction instruction according to t and the rotation angular acceleration a' of the user head in the horizontal direction may include the following several types.

1. When $|a'|<a_5$, a third interface that faces a front-view sightline of the user is determined, and a fifth interaction instruction is generated. The third interface is an interface in the at least two interfaces that is located on the left or right of the first interface. The fifth interaction instruction is used to instruct the display component to switch an interface in an active state from the first interface to the third interface, $a_5$ is a preset value, and $0<a_5$.

Figure 2K:
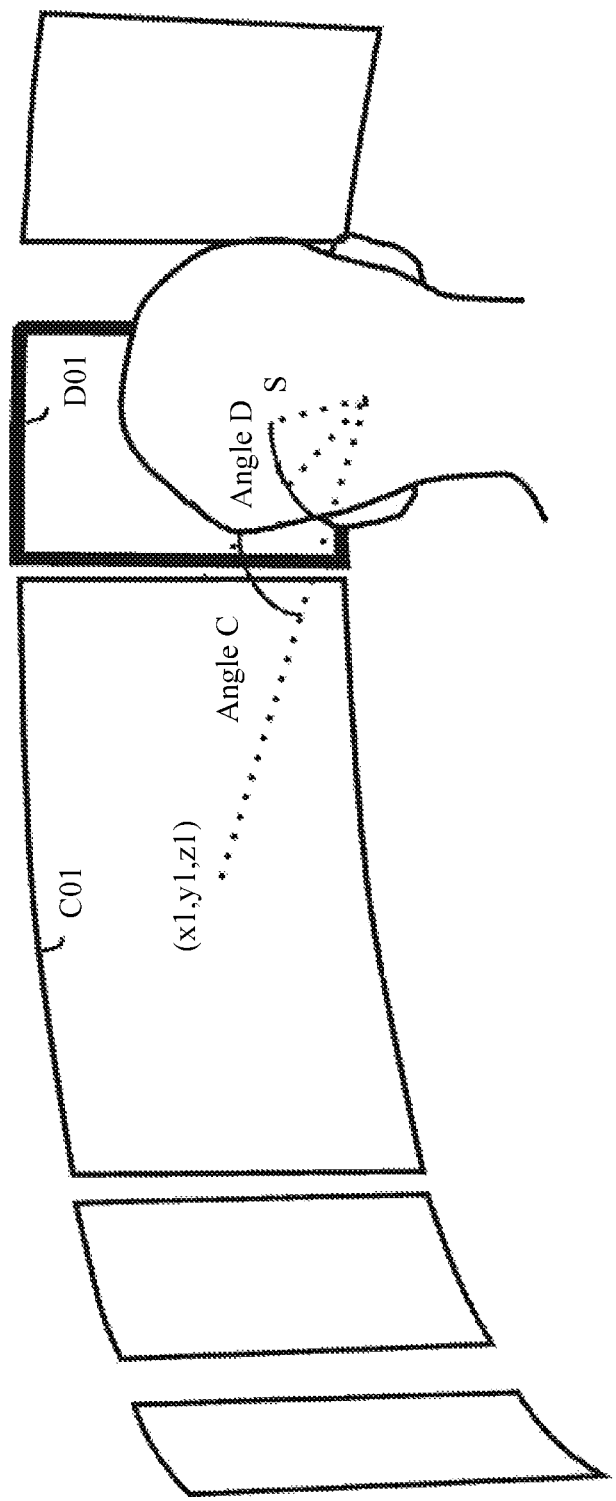
FIG. 2K is a schematic diagram for switching an active interface according to the embodiment shown in FIG. 2A.

The interface layout shown in FIG. 2B is used as an example. Referring to FIG. 2K, FIG. 2K shows a schematic diagram for switching an active interface. When the electronic device detects that the user rotates to the right, and a rotation angular acceleration is less than a threshold, it is considered that the user intends to switch a current active interface to another interface on the right of the current interface. When a rotation angle of the user head is less than an angle C, it is considered that an interface that faces the front-view sightline of the user is still the interface C01. In this case, the interface C01 remains in an active state. When a rotation angle of the user head is greater than the angle C and reaches an angle D, it is considered that the interface that faces the front-view sightline of the user changes to the interface D01. In this case, the fifth interaction instruction is generated. When the electronic device executes the instruction, the interface C01 is deactivated, and at the same time, the interface D01 is activated. In this case, operation logic of the interface D01 is similar to that of step 203c, and details are not described herein. When the user continues to rotate the head to the right at a relatively small angular acceleration, and the interface that faces the front-view sightline of the user changes to the interface E01, the interface D01 is deactivated, and at the same time, the interface E01 is activated. Similarly, it is considered that the user intends to switch a current active interface to another interface on the left of the current interface when the electronic device detects that the user head rotates to the left, and a rotation angular acceleration is less than a threshold.

2. When $|a'|<a_6$, a front-view sightline of the user does not face any interface, and no other interface in the at least two interfaces exists in the horizontal direction in which the user head rotates, a sixth interaction instruction is generated. The sixth interaction instruction is used to instruct the display component to display a functional interface except the at least two interfaces.

The schematic diagram for switching an active interface shown in FIG. 2K is further used as an example. Based on FIG. 2K, after the interface E01 is activated, the electronic device generates the sixth interaction instruction if the user continues to rotate the head to the right at a relatively small angular acceleration, and there is no another interface in a direction of the front-view sightline of the user. After the electronic device executes the sixth interaction instruction, the function specific interface that was originally located behind the user head is displayed in the direction of the front-view sightline of the user, and at the same time, the interface A01 to the interface E01 move behind the user head. After the user keeps the head still for a period of time, the electronic device executes a function corresponding to the function specific interface, such as exiting an interface display state.

Optionally, the user may enter the interface display state again by rotating the head, that is, step 201 is triggered again. For example, step 201 is triggered when the electronic device detects, according to the rotation parameters of the user head, that the user rotates the head back and forth in the horizontal or vertical direction at least twice.

3. A seventh interaction instruction is generated when $|a'| \geq a_7$. The seventh interaction instruction is used to instruct the display component to control the at least one interface to rotate around the user head according to the rotation parameters of the user head.

For example, the electronic device generates the seventh interaction instruction when the user head rotates to the left or right, and a rotation angular acceleration reaches or exceeds a threshold. When the electronic device executes the instruction, the at least one interface as a whole follows the user head into upward rotation, with the user head at the center. Rotation parameters of the at least one interface are consistent with the rotation parameters of the user head in order to ensure that a front-view sightline of the user is located at the center of the interface C01. Alternatively, in another possible implementation manner, rotation parameters of the at least one interface may be consistent only with rotation parameters of the user head in the horizontal direction.

It should be noted that, values of $a_5$, $a_6$, and $a_7$ may be the same when the electronic device supports generation of the fifth, the sixth, and the seventh interaction instructions.

Figure 2L:
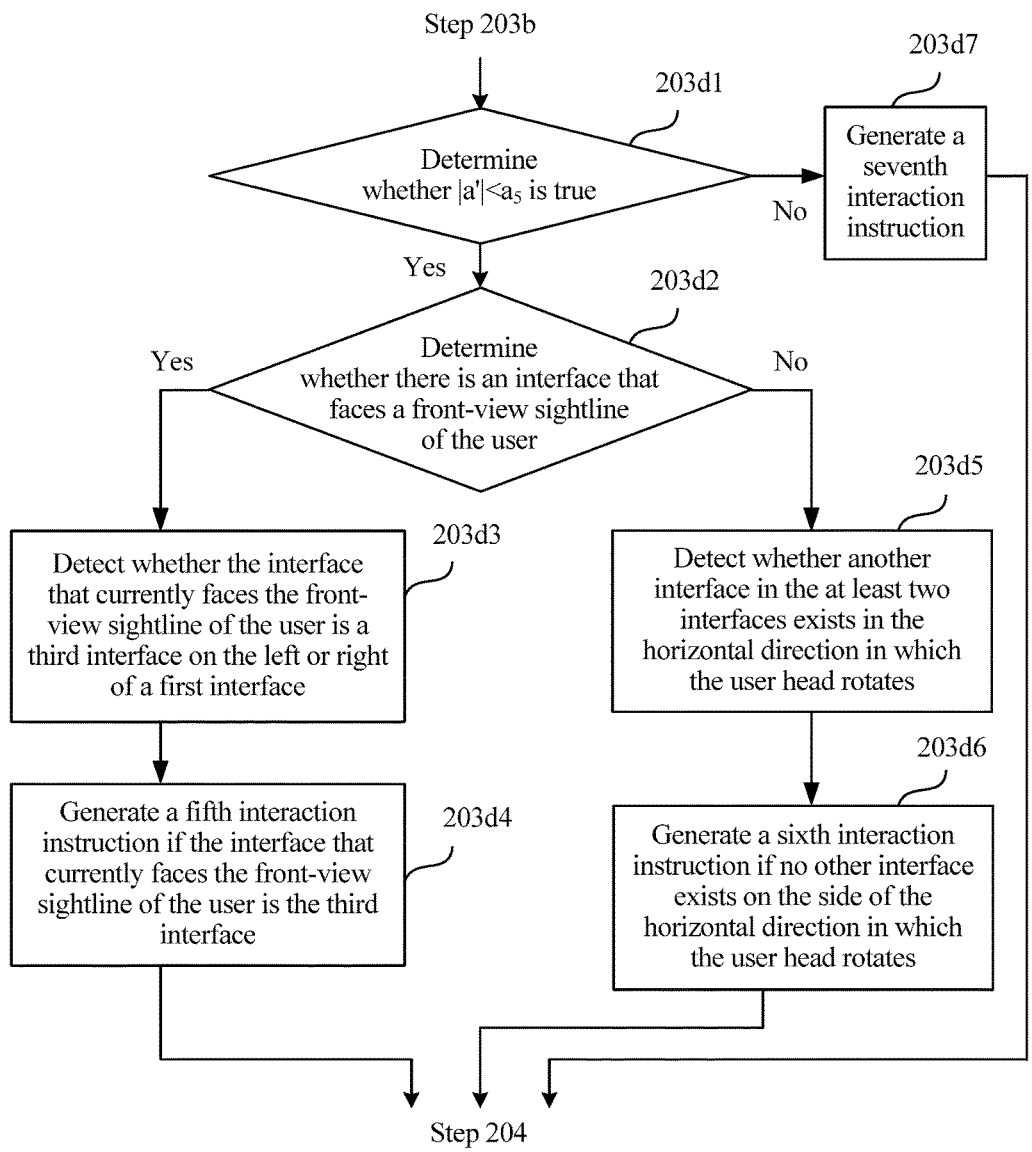
FIG. 2L is a flowchart of a second-type interaction instruction generating method according to the embodiment shown in FIG. 2A.

Further, FIG. 2K is used as an example. Referring to FIG. 2L, FIG. 2L shows a flowchart of a second-type interaction instruction generating method, and shows a possible implementation procedure of step 203d. For example, values of $a_5$, $a_6$, and $a_7$ are the same. As shown in FIG. 2L, the second-type interaction instruction generating method may include the following steps.

Step 203d1: Determine whether $|a'|<a_5$ is true, proceed to step 203d2 if $|a'|<a_5$ is true, and proceed to step 203d7 if $|a'|<a_5$ is false.

Step 203d2: Determine whether there is an interface that faces a front-view sightline of the user, proceed to step 203d3 if there is an interface that faces a front-view sightline of the user, and proceed to step 203d5 if there is no interface that faces a front-view sightline of the user.

Step 203d3: Detect whether the interface that currently faces the front-view sightline of the user is a third interface on the left or right of a first interface.

Step 203d4: Generate a fifth interaction instruction if the interface that currently faces the front-view sightline of the user is the third interface.

Keep the current interface unchanged if the interface that currently faces the front-view sightline of the user is still the first interface.

Step 203d5: Detect whether another interface in the at least two interfaces exists in the horizontal direction in which the user head rotates.

Step 203d6: Generate a sixth interaction instruction if no other interface exists on the side of the horizontal direction in which the user head rotates.

Step 203d7: Generate a seventh interaction instruction.

Step 203 may be implemented by the processor 110 in the electronic device 100 by executing the instruction determining module 1542.

Step 204: Execute the determined interaction instruction to implement interaction control of the interfaces displayed by the display component.

The interface layout shown in FIG. 2B is used as an example. After the electronic device executes the interaction instruction generated in step 203, an interaction effect described in step 203c or step 203d may be implemented, and details are not described herein.

Step 204 may be implemented by the processor 110 in the electronic device 100 using the execution module 1543.

In conclusion, in the method described in this embodiment of the present disclosure, rotation parameters such as a rotation direction, a rotation angle, and a rotation angular acceleration of a user head are obtained, an interaction instruction is determined with reference to the rotation parameters and a preset instruction determining rule, and the determined interaction instruction is executed to implement interaction control of interfaces displayed by a display component. A method for actively interacting with a virtual interface only by rotating a user head is provided, expanding a virtual interface interaction manner, and improving user experience.

In addition, in the method described in this embodiment of the present disclosure, a user only needs to control a head rotation angle and an angular acceleration to implement an interaction operation with an interface, and may browse information in a natural interaction manner without the aid of another special device or a hand movement, thereby achieving an effect of a simplified user operation.

In addition, in the method described in this embodiment of the present disclosure, different interfaces belonging to multiple interface groups are displayed around and in front of the user head, and each interface may be switched in a corresponding interface group to implement a well-ordered arrangement of massive information. The user may switch between different displayed information by means of a simple head movement, and information access becomes more convenient.

In an example of the foregoing embodiment corresponding to FIGS. 2A-2L, the at least one interface is arranged in the left-to-right sequence. In practical application, the at least one interface may be arranged in a top-to-bottom sequence, and operation logic may be similar to the operation logic in the foregoing embodiment corresponding to the FIGS. 2A-2L. For example, when a horizontal rotation angle of a user head is relatively large, the first interaction instruction, the second interaction instruction, or the fourth interaction instruction is generated, or the fifth interaction instruction, the sixth interaction instruction, or the seventh interaction instruction is generated when a vertical rotation angle of a user head is relatively large.

Figure 3:
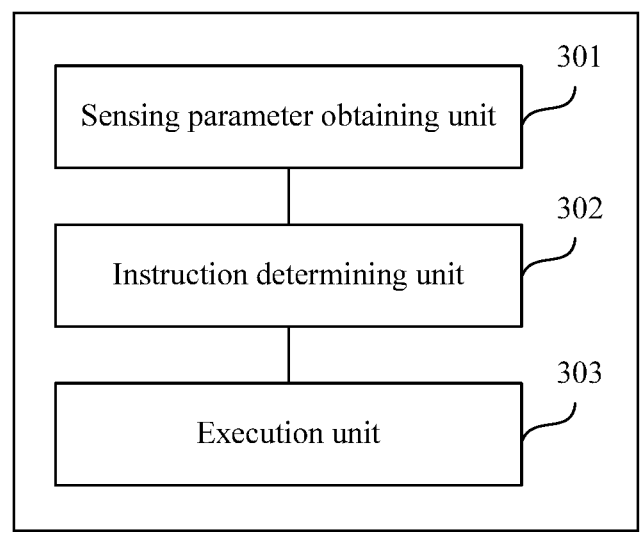
FIG. 3 is a block diagram of an interface interaction apparatus according to an exemplary embodiment of the present disclosure.

Referring to FIG. 3, FIG. 3 shows a block diagram of an interface interaction apparatus provided by an exemplary embodiment of the present disclosure. The interface interaction apparatus may implement all or part of functions of the electronic device 110 shown in FIG. 1 using one or a combination of software and hardware. The interface interaction apparatus may include a sensing parameter obtaining unit 301, an instruction determining unit 302, and an execution unit 303.

The sensing parameter obtaining unit 301 has a same or similar function as the sensing parameter obtaining module 1541.

The instruction determining unit 302 has a same or similar function as the instruction determining module 1542.

The execution unit 303 has a same or similar function as the execution module 1543.

A person of ordinary skill in the art may understand that all or some of the steps of the embodiments may be implemented by hardware or a program instructing related hardware. The program may be stored in a computer-readable storage medium. The storage medium may include a ROM, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. An interface interaction apparatus, comprising:
   a display component configured to display interfaces;
   a memory comprising instructions; and
   a processor coupled to the memory and the display component, wherein the processor is configured to execute the instructions, which cause the processor to be configured to:
   obtain rotation parameters of a user head, wherein the rotation parameters comprise a rotation direction, a rotation angle, and a rotation angular acceleration; and
   obtain an interaction instruction according to the rotation parameters and a preset instruction determining rule, wherein the preset instruction determining rule comprises:
   determining whether a rotation angle of the user head in a vertical direction (r) is greater than (>) a rotation angle of the user head in a horizontal direction (t);
   generating a first interaction instruction using both of the r and a comparison of a rotation angular acceleration of the user head in the vertical direction (a)

against a first threshold ($a_1$) when the r>the t is true, an absolute value of the r is an element of a first predefined set of rotation angles, and an absolute value of the a is less than the $a_1$;

generating a second interaction instruction using both of the t and a rotation angular acceleration of the user head in the horizontal direction (a') when the r>the t is false; and executing either the first interaction instruction or the second interaction instruction to implement interaction control of the interfaces displayed on the display component.

2. The interface interaction apparatus of claim 1, wherein the interfaces displayed comprise at least two interfaces, wherein each of the at least two interfaces belong to different interface groups, wherein each interface group of the interface groups comprises at least one interface, and wherein only one interface in each of the interface groups is displayed at a time.

3. The interface interaction apparatus of claim 2, wherein the at least two interfaces are arranged in a left-to-right sequence, and wherein a first interface that faces a front-view sightline of a user is in an active state.

4. The interface interaction apparatus of claim 3, wherein the first interaction instruction instructs the display component to replace the first interface with a second interface, wherein the second interface is in an interface group to which the first interface belongs and follows the first interface, wherein $A_1$ and $B_1$ are the first predefined set of rotation angles, wherein the $a_1$ is a preset rotation angular acceleration value, wherein 0<the $A_1$<the $B_1$, and wherein 0<the $a_1$.

5. The interface interaction apparatus of claim 3, wherein the preset instruction determining rule further comprises:

generating another second interaction instruction using both of the r and a comparison of the rotation angular acceleration of the user head in the vertical direction (a) against a second threshold ($a_2$) when the r>the t is true, an absolute value of the r is an element of a second predefined set of rotation angles, and an absolute value of the a is less than the $a_2$; and wherein the another second interaction instruction instructs the display component to display at least one control interface of the first interface, wherein $A_2$ and $B_2$ are the second predefined set of rotation angles, wherein the $a_2$ is a preset rotation angular acceleration value, wherein 0<the $A_2$<the $B_2$, and wherein 0<the $a_2$.

6. The interface interaction apparatus of claim 5, wherein each of the at least one control interface corresponds to one control operation, and wherein the instructions further cause the processor to be configured to:

determine a target control interface, wherein the target control interface is a control interface that faces the front-view sightline of the user;

control the target control interface to enter the active state;

detect whether a duration that the target control interface remains in the active state is greater than a predetermined duration; and generate a third interaction instruction when the duration that the target control interface remains in the active state is greater than the predetermined duration, wherein the third interaction instruction is used to instruct the display component to display an execution result after a control operation corresponding to the target control interface is performed on the first interface.

7. The interface interaction apparatus of claim 3, wherein the instructions further cause the processor to be configured to generate a fourth interaction instruction when the user head rotates upward and the |a|≥$a_3$, or when the user head rotates downward and the |a|≥$a_4$, wherein the fourth interaction instruction is used to instruct the display component to control the at least one interface to rotate in a direction according to the rotation parameters of the user head, wherein the $a_3$ and the $a_4$ are preset rotation angular acceleration values, wherein 0<the $a_3$, and wherein 0<the $a_4$.

8. The interface interaction apparatus of claim 3, wherein the instructions further cause the processor to be configured to:

when generating the second interaction instruction, determine a third interface that faces the front-view sightline of the user when |a'|<$a_5$, wherein the third interface is an interface in the at least two interfaces that is located on the left or right of the first interface; and generate a fifth interaction instruction, wherein the fifth interaction instruction is used to instruct the display component to switch an interface in the active state from the first interface to the third interface, wherein the $a_5$ is a preset rotation angular acceleration value, and wherein 0<the $a_5$.

9. The interface interaction apparatus of claim 3, wherein the instructions further cause the processor to be configured to generate a sixth interaction instruction when |a'|<$a_6$, wherein the sixth interaction instruction instructs the display component to display a functional interface comprising a function except the at least two interfaces, wherein the $a_6$ is a preset rotation angular acceleration value, and wherein 0<the $a_6$.

10. The interface interaction apparatus of claim 3, wherein the instructions further cause the processor to be configured to generate a seventh interaction instruction when |a'|≥$a_7$, wherein the seventh interaction instruction is used to instruct the display component to control the at least one interface to rotate in a direction according to the rotation parameters of the user head, wherein the $a_7$ is a preset rotation angular acceleration value, and wherein 0<the $a_7$.

11. The interface interaction apparatus of claim 1, wherein the interfaces displayed are interfaces based on an augmented reality technology or a virtual reality technology.

12. An interface interaction method implemented by an interface interaction apparatus, comprising:

obtaining rotation parameters of a user head, wherein the rotation parameters comprise a rotation direction, a rotation angle, and a rotation angular acceleration; and obtaining an interaction instruction according to the rotation parameters and a preset instruction determining rule, wherein the preset instruction determining rule comprises:

determining whether a rotation angle of the user head in a vertical direction (r) is greater than (>) a rotation angle of the user head in a horizontal direction (t);

generating a first interaction instruction using both of the r and a comparison of a rotation angular acceleration of the user head in the vertical direction (a) against a first threshold ($a_1$) when the r>the t is true, an absolute value of the r is an element of a first predefined set of rotation angles and an absolute value of the a is less than the $a_1$; and generating a second interaction instruction using both of the t and a rotation angular acceleration of the user head in the horizontal direction (a') when the r>the t is false; and executing either the first interaction instruction or the second interaction instruction to implement interaction control of interfaces displayed by a display component, wherein the interface interaction apparatus comprises the display component.

13. The interface interaction method of claim 12, wherein the interfaces displayed comprise at least two interfaces, wherein each of the at least two interfaces belong to different interface groups, wherein each interface group of the interface groups comprises at least one interface, and wherein only one interface in each of the interface groups is displayed at a time.

14. The interface interaction method of claim 13, wherein the at least two interfaces are arranged in a left-to-right sequence, and wherein a first interface that faces a front-view sightline of a user is in an active state.

15. The interface interaction method of claim 14, wherein the first interaction instruction instructing the display component to replace the first interface with a second interface, wherein the second interface is in an interface group to which the first interface belongs and that follows the first interface, wherein $A_1$ and $B_1$, are the first predefined set of rotation angles, wherein the $a_1$ is a preset rotation angular acceleration value, wherein $0 < $ the $A_1 < $ the $B_1$, and wherein $0 < $ the $a_1$.

16. The interface interaction method of claim 14, wherein the preset instruction determining rule further comprises:
  generating another second interaction instruction using both of the r and a comparison of the rotation angular acceleration of the user head in the vertical direction (a) against a second threshold ($a_2$) when the r>the t is true, an absolute value of the r is an element of a second predefined set of rotation angles, and an absolute value of the a is less than the $a_2$; and
  wherein the another second interaction instruction is used to instruct the display component to display at least one control interface of the first interface, wherein $A_2$ and $B_2$ are the second predefined set of rotation angles, wherein the $a_2$ is a preset rotation angular acceleration value, wherein $0 < $ the $A_2 < $ the $B_2$, and wherein $0 < $ the $a_2$.

17. The interface interaction method of claim 16, wherein each of the at least one control interface corresponds to one control operation, and wherein the interface interaction method further comprises:
  determining a target control interface, wherein the target control interface is a control interface that faces the front-view sightline of the user;
  controlling the target control interface to enter the active state;
  detecting whether a duration that the target control interface remains in the active state is greater than a predetermined duration; and
  generating a third interaction instruction when the duration that the target control interface remains in the active state is greater than the predetermined duration, wherein the third interaction instruction is used to instruct the display component to display an execution result after a control operation corresponding to the target control interface is performed on the first interface.

18. The interface interaction method of claim 14, wherein generating the first interaction instruction comprises generating a fourth interaction instruction when the user head rotates upward and $|a| \geq a_3$, or when the user head rotates downward and $|a| \geq a_4$, wherein the fourth interaction instruction instructing the display component to control the at least one interface to rotate in a direction according to the rotation parameters of the user head, wherein the $a_3$ and the $a_4$ are preset rotation angular acceleration values, wherein $0 < $ the $a_3$, and wherein $0 < $ the $a_4$.

19. The interface interaction method of claim 14, wherein generating the second interaction instruction comprises:
  determining a third interface that faces the front-view sightline of the user when $|a'| < a_5$, wherein the third interface is an interface in the at least two interfaces that is located on the left or right of the first interface, wherein $a_5$ is a preset rotation angular acceleration value, and wherein $0 < $ the $a_5$; and
  generating a fifth interaction instruction, wherein the fifth interaction instruction is used to instruct the display component to switch an interface in the active state from the first interface to the third interface.

20. The interface interaction method of claim 14, wherein generating the second interaction instruction comprises generating a sixth interaction instruction when $|a'| < a_6$, wherein the sixth interaction instruction is used to instruct the display component to display a functional interface comprising a function except the at least two interfaces, wherein the $a_6$ is a preset rotation angular acceleration value, and wherein $0 < $ the $a_6$.

21. The interface interaction method of claim 14, wherein generating the second interaction instruction comprises generating a seventh interaction instruction when $|a'| \geq a_7$, wherein the seventh interaction instruction is used to instruct the display component to control the at least one interface to rotate in a direction according to the rotation parameters of the user head, wherein $a_7$ is a preset rotation angular acceleration value, and wherein $0 < $ the $a_7$.

22. The interface interaction method of claim 12, wherein the interfaces displayed are interfaces based on an augmented reality technology or a virtual reality technology.

* * * * *

UNITED STATES PATENT AND TRADEMARK OFFICE
CERTIFICATE OF CORRECTION

PATENT NO. : 10,860,092 B2
APPLICATION NO. : 15/405404
DATED : December 8, 2020
INVENTOR(S) : Jianming Dong, Weixi Zheng and Zhe Sun It is certified that error appears in the above-identified patent and that said Letters Patent is hereby corrected as shown below:

In the Claims

Claim 10, Column 16, Line 37: "$|a'|\geq a_7$" should read "$|a'|>a_7$"

Claim 18, Column 18, Line 12: "$|a'|\geq a_3$" should read "$|a'|>a_3$"

Claim 18, Column 18, Line 13: "$|a'|\geq a_4$" should read "$|a'|>a_4$"

Claim 21, Column 18, Line 42: "$|a'|\geq a_7$" should read "$|a'|>a_7$"

Signed and Sealed this
Nineteenth Day of January, 2021

Andrei Iancu
*Director of the United States Patent and Trademark Office*